United States Patent [19]

Bell

[11] 4,163,507

[45] Aug. 7, 1979

[54] OPTICAL SEED SENSOR FOR A SEED PLANTER MONITOR

[75] Inventor: Dennis M. Bell, Hudson, Ill.

[73] Assignee: International Tapetronics Corporation, Bloomington, Ill.

[21] Appl. No.: 888,398

[22] Filed: Mar. 20, 1978

[51] Int. Cl.$^2$ ............................................. B65B 57/18
[52] U.S. Cl. ...................................................... 221/2
[58] Field of Search ...................... 221/2, 13, 7, 8, 211, 221/278; 250/222 R, 222 PC; 340/239

[56] References Cited

U.S. PATENT DOCUMENTS 3,974,377  8/1976  Steffen ............................ 250/222 R Primary Examiner—Stanley H. Tollberg
Attorney, Agent, or Firm—McCaleb, Lucas & Brugman

[57] ABSTRACT

An optical seed sensor for a seed planter monitor utilizes light emitting diodes and a rapidly-responding light-receiving solar cell mounted in a seed dispensing chute. A solar cell light shield with a slit narrower than the diameter of a typical seed is mounted adjacent to the solar cell. When a seed passes the light shield, the voltage output of the light-receiving solar cell is temporarily reduced in response to a change in intensity of light at the solar cell. Electronic circuitry converts such solar cell voltage fluctuations into electrical counting pulses for the seed planter monitor. The rapidly-responding solar cell, the partially shielded solar cell and the electronic circuitry cooperate to discriminate between closely spaced or partially overlapping seeds passing through the dispensing chute in order to achieve accurate seed counting.

5 Claims, 8 Drawing Figures

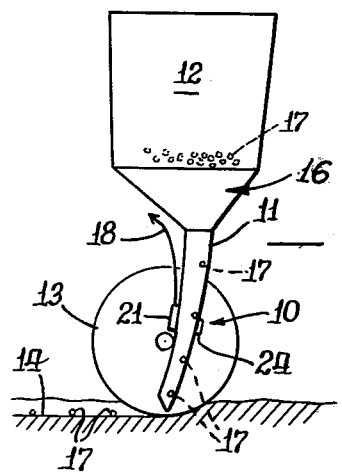
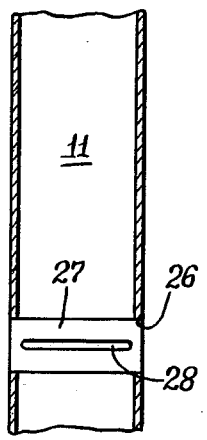
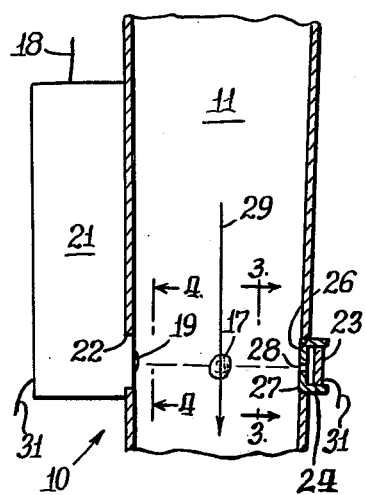
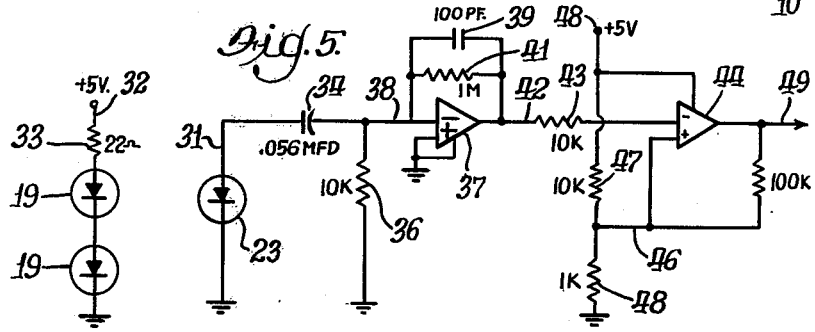
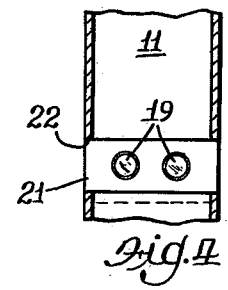
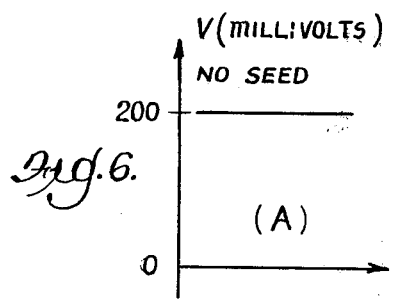
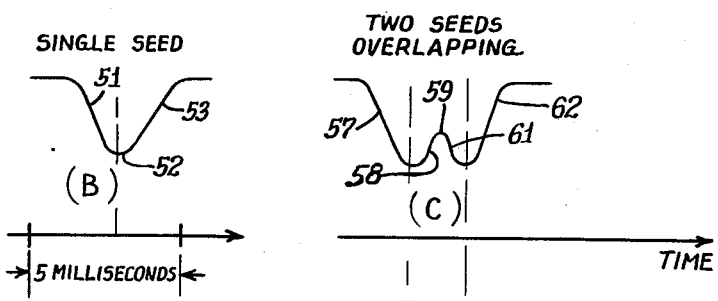
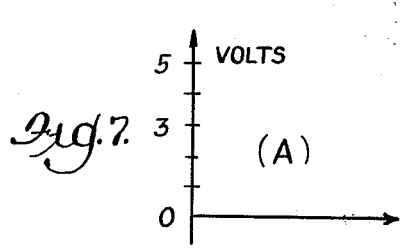
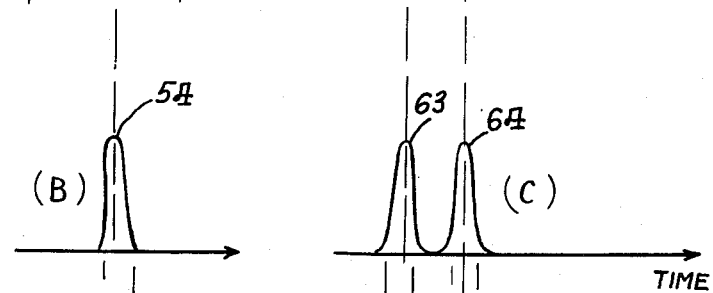
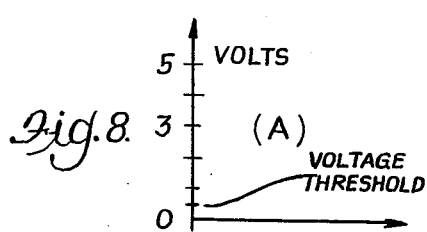
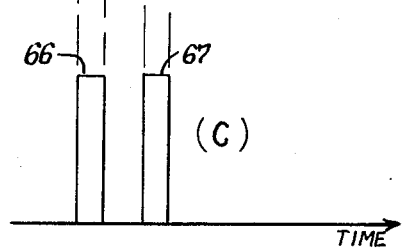

OPTICAL SEED SENSOR FOR A SEED PLANTER MONITOR

BACKGROUND OF THE INVENTION

1. Field of the Invention

This invention relates in general to seed density monitors and counters employed in seed planters and, more particularly, to an improved seed sensor for use therewith.

2. Description of the Prior Art

As is well-known in the art, a seed planter typically includes a group of seed chutes, one for each row, which automatically dispense individual seeds from hoppers into furrows formed in the ground by the planter as it is moved across a field. Seed planter monitors such as those disclosed in Gregory U.S. Pat. No. 3,422,776, issued Jan. 21, 1969, and Steffen U.S. Pat No. 3,912,121, issued Oct. 14, 1975, are operable to monitor and count the number of seeds periodically dispensed by seed planters. Such seed planter monitors employ electronic counting devices which receive electrical seed counting pulses from seed sensors located in the seed dispensing chutes.

Prior known seed sensors include electronic pulse-generating circuitry typically actuated by the output of relatively slow-reacting photo-conductive cells. However, as those fimiliar with the art will readily appreciate, a problem has arisen with the use of photo-conductive cells in seed sensors. When multiple seeds in close or partially overlapping relationship drop past a slow-acting photo-conductive cell, the sensor frequently counts the multiple seeds as one, with resultant inaccuracy in the electronic pulse information supplied by the sensor to the monitoring circuitry.

SUMMARY OF THE INVENTION

The present invention provides a simple and inexpensive solution to this problem. The present invention employs at least one light emitting diode and a relatively rapidly-responding solar cell light receiving device mounted in opposing relationship within each seed dispensing chute. The present invention further includes a light shield mounted adjacent to the solar cell and having a slit narrower than the diameter of a typcial seed in order to limit the amount of light at the surface of the solar cell. Because of the fast response time of the light-receiving solar cell, the solar cell voltage output is temporarily reduced in response to the change in light intensity at the solar cell when a seed falls past the narrow slit of the light shield. If two seeds are partially overlapping, the intensity of the light striking the solar cell surface will first decrease and then increase slightly as the first seed passes the slit; the light intensity will then decrease again as the second seed passses the slit and will finally resume its steady state value.

The electronic circuitry of the sensor of the present invention includes a differentiator which detects changes in the solar cell voltage output with respect to time. A comparator circuit converts the differentiator output voltages into discrete pulses which are in turn applied to the monitor circuit. Thus, the rapidly-responding solar cell, the partially shielded solar cell and the sensor circuitry cooperate to discriminate between closely spaced or partially overlapping seeds in order to provide accurate seed counting pulses to the seed planter monitor.

According to another aspect of the present invention, light emitting diodes generate light in the infrared region, thereby minimizing the effects of dust which would tend to impair the optical sensitivity of the solar cell.

A further object of the present invention is to provide a seed sensor which is relatively simple in design but which accurately provides voltage output pulses representative of the number of seeds being dispensed.

Another object of the present invention is to provide a seed sensor which differentiates between closely spaced or partially overlapping seeds.

These and other objects and advantages of the present invention will become apparent when considered in connectin with the following specification and drawings which, when taken together, disclose a preferred embodiment of the invention.

BRIEF DESCRIPTION OF THE DRAWINGS

FIG. 1 is a side elevational view of a portion of a seed dispenser embodying the optical seed sensor of the present invention;

FIG. 2 is a vertical sectional view, with parts broken away, of the optical seed sensor generally illustrated in FIG. 1;

FIG. 3 is a vertical elevational view taken substantially along the lines 3—3 of FIG. 2 and illustrating the light shield employed in the present invention;

FIG. 4 is a vertical sectional view taken substantially along the lines 4—4 of FIG. 2 and illustrating the light emitting diode means used in the present invention;

FIG. 5 is a schematic diagram illustrating the electronic circuitry of the optical seed sensor of the present invention;

FIGS. 6(A), (B) and (C) are plots of the solar cell output voltage with respect to time for the no seed, single seed and two overlapping seed conditions, respectively;

FIGS. 7(A), (B) and (C) are plots of the amplified differentiator output voltage with respect to time for the conditions represented in FIGS. 6(A), (B) and (C); and FIGS. 8(A), (B) and (C) are plots of the comparator output voltage with respect to time for the conditions represented in FIGS. 6(A), (B) and (C).

DESCRIPTION OF THE PREFERRED EMBODIMENT

With particular reference to FIG. 1, the present invention comprises a seed sensor, generally illustrated by reference numeral 10, mounted in a seed dispensing chute 11 provided for each row to be planted. Each chute 11 is connected to a seed hopper 12 provided for seed storage during planting. A wheel 13 creates a furrow 14 in the ground surface as the seed planter is moved across the field in the direction of the arrow shown in FIG. 1 by a tractor (not shown), in a manner well-known in the art. A dispensing mechanism, generally illustrated by reference numeral 16, is operable to periodically dispense seeds 17 into the furrow.

In order to monitor and count the number of seeds dispensed by the seed planter, a seed planter monitor (not shown) such as that disclosed in the previously mentioned U.S. Pat. Nos. 3,422,776 and 3,912,121 receives electrical pulses, representative of the number of seeds 17 being planted, from the seed sensor 10 associated with each seed dispensing chute 11. The seed planter monitor displays the seed count to the planter operator in a well-known manner. The output of the seed sensor 10 is connected to the seed planter monitor through cables 18.

With reference to FIGS. 2, 3 and 4, the seed sensor 10 of the present invention comprises light emitting diode means, preferably a pair of light emitting diodes 19, operable to generate and emit light in the infrared region. The pair of diodes 19 are mounted side-by-side on one side of a circuit package 21 (FIGS. 2 and 4) and protrude into the interior of chute 11 through an opening 22 for full dispersion of infrared light within the interior of the chute 11 in the sensor region.

A rapidly-responding solar cell light receiving means 23 is mounted in the chute 11 by means of a U-shaped bracket 24 which is inserted in a slot 26 in the chute (FIG. 2). The solar cell means 23 is preferably a silicon solar cell having a response time up to ten times shorter than a typical photo-conductive cell. The bracket 24 has a surface comprising a light shield 27 having a slit or window 28 narrower than the diameter of a typcial seed 17, the light shield surface 27 being disposed within the chute 11 adjacent to the solar cell 23 and interiorly thereof. The slit 28 is transverse to the path, represented by line 29 in FIG. 2, of a seed 17 dispensed through the chute 11 between the light emitting diode means 19 and the solar cell means 23. The solar cell means, which receives light generated by light emitting diode means 19, is electrically connected to circuitry in the electronic package 21 by means of a lead 31. Because the light emitting diodes 19 generate light in the infrared region, the sensitivity of the solar cell means 23 is not significantly impaired by normal amounts of dust in the chute 11.

The light shield 27 limits the intensity of the light generated by the light emitting diode means 19 and received by the solar cell means 23 for discrimination between closely spaced or partially overlapping seeds dispensed through the chute 11 in a manner to be more fully described later. The width of the slit 28 is optimally approximately forty percent the diameter of a typical seed 17 dispensed through the chute 11. If the width of the slit is larger than this preferred width, the discrimination between closely-spaced or overlapping seeds will be reduced; if the width is decreased below this preferred value, the amount of light received by the solar means 23 and hence the solar cell output will be reduced.

The operation of the electronic circuit components of the present invention contained within the circuit package 21 is readily understood with addition reference to FIG. 5, which is a schematic diagram of the preferred electronic circuit. It will, of course, be recognized that voltages and component values other than those illustrated and described may also be used.

As shown in FIG. 5, a voltage source, typically on the order of +5 volts D.C., at a terminal 32 supplies electrical energy through a resistor 33 to the light emitting diode means 19, which are connected in series to ground. The solar cell means 23, which generates a voltage output proportional to the intensity of the light it receives from the light emitting diode means 19, is connected to a differentiator circuit means comprising a capacitor 34 and a grounded resistor 36, the values of capacitor 34 and resistor 36 being selected as indicated in FIG. 5. The output of the differentiator circuit means is in turn connected to the input of an operational amplifier 37 through an input lead 38, the gain of amplifier 37 serving to compensate for circuit losses. A capacitor 39 and a feedback resistor 41 are connected in parallel across the operational amplifier 37. The differentiator circuit means is operable to provide an output voltage on line 42 proportional to the rate of change of the output of the solar cell means 23. Gradual changes in the ambient light intensity, the output of the light emitting diode means 19 and in the sensitivity of the solar cell means 23 will not result in erroneous output signal counting pulses.

Amplifier 37 is operated in the inverting mode with its non-inverting (+) input grounded; its inverting (−) input on lead 38 is at virtual ground due to the high amplifier open loop gain and the grounded non-inverting input. Resistor 36 provides a low impedance path to ground for the input bias current from the inverting input terminal of operational amplifier 37, thereby providing a relatively stable voltage for the amplifier when it is in its steady state condition.

There are two reasons for operating input 38 at virtual ground. First, since the solar cell 23 is connected to input 38 through capacitor 34, any rapid variations in the solar cell output will be provided a low impedance path to virtual ground through capacitor 34. The output voltage of a silicon solar cell is substantially linear at relatively low levels of illumination but increases logarithmically at relatively high illumination levels. The short circuit output current of a silicon solar cell is, however, fairly linear over several decades of illumination. By supplying the output of solar cell 23 to a transient short circuit resulting from the operation of capacitor 34, a more uniform indication of relative solar cell output is achieved, along with a significant immunity to the effects of different solar cell output ranges caused by dust in the chute 11, aging of the light emitting diodes 19 or changes in ambient light levels.

Secondly, driving the input 38 at virtual ground provides the differentiator action. Any current flowing into lead 38 must be balanced by an equal and opposite current to maintain that lead at virtual ground. This balancing current is provided by feedback resistor 41, and the output voltage of amplifier 37 is therefore determined by this balancing current and the value of resistor 41. Since the solar cell output is not always changing at the same rate, capacitor 34 cannot always be modeled as a short circuit. Treating the solar cell output as a changing voltage, the current through capacitor 34, which is proportional to the rate of change of the solar cell output, requires an equal and opposite balancing current through resistor 41 to determine the amplifier output.

The output of the amplifier 37 on line 42 is connected through a resistor 43 to the input of a comparator circuit means comprising an operational amplifier 44, which is in turn connected to a non-critical threshold reference voltage on a line 46 established by a resistor 47 connected to a +5 volt D.C. terminal 48 and a series resistor 48 in turn connected to ground. The comparator circuit means will generate a counting pulse on an output line 49 whenever the voltage output of the differentiator circuit means on line 42 exceeds the threshold voltage value. The counting pulses on line 49 are connected to the seed planter monitor (not shown) through cables 18. The operational amplifiers 37 and 44 are preferably two independent high gain frequency compensated amplifiers conveniently provided in a single package. The comparator circuit means provides uniform electrical pulses sufficiently strong to feed the TTL circuitry of the seed planter monitor (not shown) connected to the seed sensor output on line 49. The pulses provided at the output 42 of the differentiator circuit means are not uniform and are not sufficiently strong to activate the monitor circuitry.

In the general operation of the present invention, the solar cell means 23 is operable to generate a voltage output in response to the presence of light emitted from the light emitting diode means 19. Passage of a dispensed seed 17 between the diode means 19 and the solar cell means 23 will temporarily reduce the intensity of the light passing through the slit 28 to the solar cell means in order to temporarily reduce its voltage output. The differentiator circuit means is operable to provide an output voltage proportional to the change of the output of the solar cell means 23 with respect to time. The comparator circuit means provides a seed counting pulse whenever the voltage output of the differentiator exceeds a predetermined threshold voltage value.

FIGS. 6, 7 and 8 are plots of voltage with respect to time for the output of the solar cell means 23, the amplified differentiator means voltage output 42 and the comparator means voltage output 49, respectively. The corresponding plots designated A, B and C in each of FIGS. 6, 7 and 8 relate to the no-seed, the single-seed and the two-overlapping seed conditions.

As shown in FIG. 6(A), with no seed 17 in chute 11, the solar cell means 23 generates an output of approximately 200 millivolts, which value may vary depending upon the ages of the light emitting diode means 19 and the solar cell means 23 and the ambient lighting and dust conditions. Since the differentiator circuit means is operable to provide an output voltage proportional to the change of the solar cell means output with respect to time, there is no differentiator circuit means output for this condition, as shown in FIG. 7(A). Nor is there any voltage output from the comparator circuit means, because the comparator is operable to provide a counting pulse only when the voltage output of the differentiator circuit means exceeds a predetermined threshold voltage value established by resistors 47 and 48.

With reference to FIG. 6(B), when a single seed passes between the diode means 19 and the solar cell means 23, the intensity of the light passing through the slit 28 of the light shield 27 to the solar cell means 23 will be temporarily reduced, as will the voltage output of the solar cell. This voltage fluctuation occurs within a time period of less than five milliseconds. As shown in FIG. 7(B), the differentiator circuit means responds to this fluctuation in solar cell means output voltage to provide an output voltage pulse having a peak 54 of a value between three and four volts. For this condition, the comparator circuit means produces an output counting pulse 56 having a width or time duration equal to that of the differentiator circuit means output.

In most instances of multiple seed passage through the detection channel defined by the region between the diode means 19 and the solar cell means 23, the seeds will not completely overlap each other. When the first of two partially overlapping seeds passes through the detection channel, the output of the solar cell means 23 will first decrease as indicated by reference numeral 57 in FIG. 6(C) and will then increase somewhat as at 58 to a level 59 below the 200 millivolt no-seed voltage output. When the second seed passes through the detection channel, the output of the solar cell will then decrease as at 61 but will then increase, as designated by reference numeral 62, to its 200 millivolt no-seed value. Because the differentiator means is operable to detect time changes in the solar cell output waveform, such changes will be converted into two discrete pulses 63, 64 at the ouput 42 of the differentiator means. These two pulses 63, 64 are then detected by the comparator circuit means which generates corresponding output pulses 66, 67, respectively, as shown in FIG. 8(C).

While a conventional slow-reacting photo-conductive cell would interpret two overlapping seeds as one, the narrow slit 28 of the light shield 27 limits the intensity of the light received by the rapidly-reacting solar cell means 23 for discrimination between closely spaced or partially overlapping seeds dispensed through the chute 11.

It is thought that the invention and many of its attendant advantages will be understood from the foregoing description, and it is apparent that various changes may be made in the form, construction and arrangement of its component parts without departing from the spirit and scope of the invention or sacrificing all of its material advantages, the form described being merely a preferred embodiment thereof.

The embodiments of the invention in which an exclusive property or privilege is claimed are defined as follows:

1. For use with a seed monitor for a seed planter having a chute for periodically dispensing seeds, an optical seed sensor comprising:

a light emitting diode means and a rapidly-responding solar cell light receiving means mounted in opposing relationship in the chute for seed passage therebetween;

a light shield having a slit narrower than the diameter of a seed, said shield being disposed within the chute adjacent to said solar cell means and interiorly thereof with said slit being transverse to the path of a seed dispensed through the chute;

said solar cell light receiving means being operable to generate a voltage output in response to the presence of light emitted from said diode means, the passage of a dispensed seed between said diode means and said solar cell means serving to temporarily reduce the intensity of the light passing through said slit to said solar cell means to temporarily reduce said voltage output thereof;

a differentiator circuit means and a comparator circuit means connected in series with said solar cell means output, said differentiator circuit means being operable to provide an output voltage proportional to the change of said solar cell means output with respect to time, and said comparator circuit means being operable to provide a counting pulse whenever the voltage output of said differentiator circuit means exceeds a predetermined threshold voltage value;

whereby said light shield limits the intensity of the light received by said rapidly-responding solar cell means for discrimination between closely spaced or partially overlapping seeds dispensed through the chutes.

2. The seed sensor of claim 1 wherein the width of said slit is approximately forty percent of the diameter of a typical seed dispensed through the chute.

3. The seed sensor of claim 1 and an amplifying means connected between said differentiator circuit means and said comparator circuit means.

4. The seed sensor of claim 1 wherein said light emitting diode means is operable to generate light in the infrared region.

5. The seed sensor of claim 1 wherein said light emitting diode means comprises plural light emitting diodes for full light dispersion within the chute in the region between said diode means and said solar cell light receiving means.

* * * * *

UNITED STATES PATENT OFFICE
CERTIFICATE OF CORRECTION

PATENT NO. : 4,163,507
DATED : August 7, 1979
INVENTOR(S) : Dennis M. Bell

It is certified that error appears in the above-identified patent and that said Letters Patent are hereby corrected as shown below:

Col. 1; line 63 - "applied" should be -- supplied --

Col. 3; line 46 - "solar means" should be -- solar cell means --

Signed and Sealed this

Thirtieth Day of October 1979

[SEAL]

Attest:

RUTH C. MASON
Attesting Officer

LUTRELLE F. PARKER
Acting Commissioner of Patents and Trademarks